US012728059B2

(12) United States Patent
Davis

(10) Patent No.: US 12,728,059 B2
(45) Date of Patent: Sep. 8, 2026

(54) METHOD OF ASSEMBLING A CASKET FROM A FOLDABLE BLANK

(71) Applicant: Vandor Group, Inc., Richmond, IN (US)

(72) Inventor: Justin Davis, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/796,427

(22) Filed: Aug. 7, 2024

(65) Prior Publication Data

US 2025/0064661 A1 Feb. 27, 2025

Related U.S. Application Data

(60) Provisional application No. 63/517,994, filed on Aug. 7, 2023.

(51) Int. Cl.

| | |
|---|---|
| ***A61G 17/007*** | (2006.01) |
| ***A61G 17/02*** | (2006.01) |
| ***B31B 50/26*** | (2017.01) |
| *B31B 100/00* | (2017.01) |
| *B31B 110/35* | (2017.01) |
| *B31B 120/70* | (2017.01) |

(52) U.S. Cl.

CPC ....... *A61G 17/0073* (2013.01); *A61G 17/034* (2017.05); *B31B 50/262* (2017.08); *B31B 2100/0024* (2017.08); *B31B 2110/35* (2017.08); *B31B 2120/70* (2017.08); *B31B 2247/00* (2013.01)

(58) Field of Classification Search

CPC .............. A61G 17/0073; A61G 17/034; B31B 50/262; B31B 2100/0024; B31B 2110/35; B31B 2120/70; B31B 2247/00; B65D 5/30; B65D 5/302; B65D 5/307; B65D 5/304; B65D 5/308

See application file for complete search history.

(56) References Cited

U.S. PATENT DOCUMENTS

| | | | | | |
|---|---|---|---|---|---|
| 432,475 | A * | 7/1890 | Brown | B65D 5/302 | 229/196 |
| 504,075 | A * | 8/1893 | Brown | B65D 5/302 | 229/197 |
| 986,721 | A * | 3/1911 | Keyer, Jr. | B65D 5/302 | 229/197 |

(Continued)

*Primary Examiner* — William L Miller

(74) *Attorney, Agent, or Firm* — Maginot, Moore & Beck LLP

(57) ABSTRACT

A casket structure and method use features built into a corrugated paper blank to temporarily retain the assembled casket body configuration while a fastening element is administered to secure the corrugated paper blank into the casket body configuration. A blank configured for such a casket structure includes a bottom panel, side panels, end panels, and flaps foldably connected to the side panels. When the blank is assembled into the casket body configuration, each flap overlaps a corresponding end panel. The end panels and overlapping flaps include a key-receiver arrangement in which a receiver is configured to engage a foldable key to at least temporarily hold each overlapping flap in direct engagement with a corresponding end panel to retain the foldable blank in the casket body configuration.

12 Claims, 5 Drawing Sheets

(56) References Cited

U.S. PATENT DOCUMENTS

| | | | | | |
|---|---|---|---|---|---|
| 1,041,872 | A * | 10/1912 | Regenstein | B65D 5/302 229/195 |
| 1,319,263 | A * | 10/1919 | Baker | B65D 5/302 229/195 |
| 1,585,390 | A * | 5/1926 | Kondolf | B65D 5/302 229/195 |
| 2,579,518 | A * | 12/1951 | Schaefer | B65D 5/302 229/162.1 |
| 2,590,371 | A * | 3/1952 | Morris | B65D 5/20 229/122.22 |
| 2,660,364 | A * | 11/1953 | Ferguson | B65D 5/302 229/120.1 |
| 3,400,640 | A * | 9/1968 | Randles | B65D 5/302 493/137 |
| 3,682,369 | A * | 8/1972 | Isakson | B65D 5/302 229/195 |
| 3,708,103 | A * | 1/1973 | Evans | B65D 5/302 229/196 |
| 4,139,146 | A * | 2/1979 | Bamburg | B65D 5/28 229/119 |
| 4,169,553 | A * | 10/1979 | Cain | B65D 5/304 229/196 |
| 4,252,267 | A * | 2/1981 | Osborne | B65D 5/304 229/149 |
| 4,871,111 | A * | 10/1989 | Mode | B65D 5/2047 229/5.84 |
| 8,375,535 | B2 | 2/2013 | Cox et al. | |
| 11,141,338 | B2 | 10/2021 | Davis et al. | |
| 12,171,697 | B1 * | 12/2024 | Garvin | A61G 17/004 |
| 2007/0084028 | A1 * | 4/2007 | Cox | A61G 17/004 27/4 |
| 2010/0178396 | A1 * | 7/2010 | Lafferty | B65D 5/302 426/243 |
| 2012/0073098 | A1 * | 3/2012 | Centenari | A61G 17/041 27/19 |
| 2014/0230203 | A1 * | 8/2014 | Cox | A61G 17/047 27/4 |
| 2016/0137337 | A1 * | 5/2016 | Hsu | B65D 5/304 229/195 |
| 2018/0194508 | A1 * | 7/2018 | Simpson | B65D 5/301 |
| 2021/0059885 | A1 * | 3/2021 | Davis | A61G 17/0073 |
| 2021/0114764 | A1 * | 4/2021 | Griswold | B65D 19/44 |
| 2024/0374452 | A1 * | 11/2024 | Wilber et al. | A61G 17/034 |
| 2025/0066065 | A1 * | 2/2025 | Cleveland, Jr. | B65D 5/4266 |

* cited by examiner

METHOD OF ASSEMBLING A CASKET FROM A FOLDABLE BLANK

PRIORITY CLAIM

This application is a utility filing from and claims priority to provisional application No. 63/517,994, filed on Aug. 7, 2023, the entire disclosure of which is incorporated herein by reference.

FIELD OF THE INVENTION

The present invention relates generally to caskets, and more particularly, to lightweight caskets.

BACKGROUND OF THE INVENTION

Caskets and cremation containers are constructed from a plurality of materials, including wood, metal, and paper materials, as well as combinations of the foregoing. These caskets and cremation containers can vary substantially in price. While wood and metal-based caskets can be expensive, paper-based cremation containers can provide a viable low-cost option, particularly when cremation is contemplated. In fact, extremely low costs may be achieved by employing a corrugated paper (also known as corrugated fiberboard) cremation container, which is a fraction of the cost of hardwood or metal caskets. Even if cost is not a major consideration, corrugated paper (also referred to as corrugated fiberboard) caskets are a popular choice for cremation, in part because they are completely consumed during the cremation process.

Many corrugated paper caskets can have ornamentation and other design elements that approximate decorative wood or steel caskets. Many people find such corrugated paper caskets to be suitable for presentation at a viewing and/or funerary service. These ornately designed paper caskets represent a cost savings over hardwood caskets, and are particularly advantageous in cases in which the casket is to be consumed during the cremation process. However, these products must be fully assembled at a factory and thus retain much of the shipment costs of wood and metal caskets.

By contrast, a less intricate Kraft paper rectangular box casket can be often constructed at a funeral home, crematory, or other user's establishment. As a consequence, the rectangular box casket (and often its lid) can be shipped flat, thereby resulting in substantial shipping savings. A drawback remains, however, in that the heavy corrugated paper structure can be unwieldy during the final assembly process. Unlike a typical moving box, the corrugated paper used in caskets can be significantly heavier, with thicker walls. Furthermore, a casket has much larger dimensions than a typical moving box, adding to the weight and unwieldiness. This causes a significant inconvenience to funeral professionals, who typically are not trained in manufacturing and who lack jigs or other equipment for assembly of large, heavy casket containers.

There is a need, therefore, for a method for assembly a corrugated fiberboard casket that reduces the inconvenience and difficulty for the funeral professional while still allowing for assembly at the funeral facility. There is also a need for a corrugated fiberboard casket that can be assembled easily, and/or without specially adapted equipment.

SUMMARY

At least some embodiments of the invention address the above-stated needs, as well as others by providing a casket structure and method that uses features built into a corrugated paper blank to temporarily retain the assembled casket body configuration while a fastening element is administered to secure the corrugated paper blank into the casket body configuration. A blank configured for such a casket structure is also contemplated.

In one embodiment, the blank includes a bottom panel, side panels, end panels, and flaps foldably connected to the side panels, and is formed of a double-walled corrugated paper. The flaps and the end panels include a key-receiver arrangement in which a receiver is configured to engage a foldable key when the blank is assembled into a box configuration. In one embodiment, each flaps includes a foldable key, and each end panel includes a pair of spaced-apart receivers that are aligned with the foldable keys when the flaps overlap the end panels. It will be appreciated that the some or all of the foldable keys and receivers may be swapped, such that the key is on the end panel, and the receiver is on the flap.

Another embodiment is a method of forming a casket that includes folding the blank into a box, wherein the flaps extend over the end panels such that the foldable keys align with the receivers. The method also includes pushing the key through the receiver so as to retain the flaps against the end panels without other external support. The method then includes installing one or more fasteners that fixedly secure the flaps to the end panels. The method optionally further includes placing a deceased human body into the box in supine position, or in other words, with the head of the deceased proximate one of the ends, and the feet (or foot) of the deceased at the other end.

DETAILED DESCRIPTION

Figure 1:
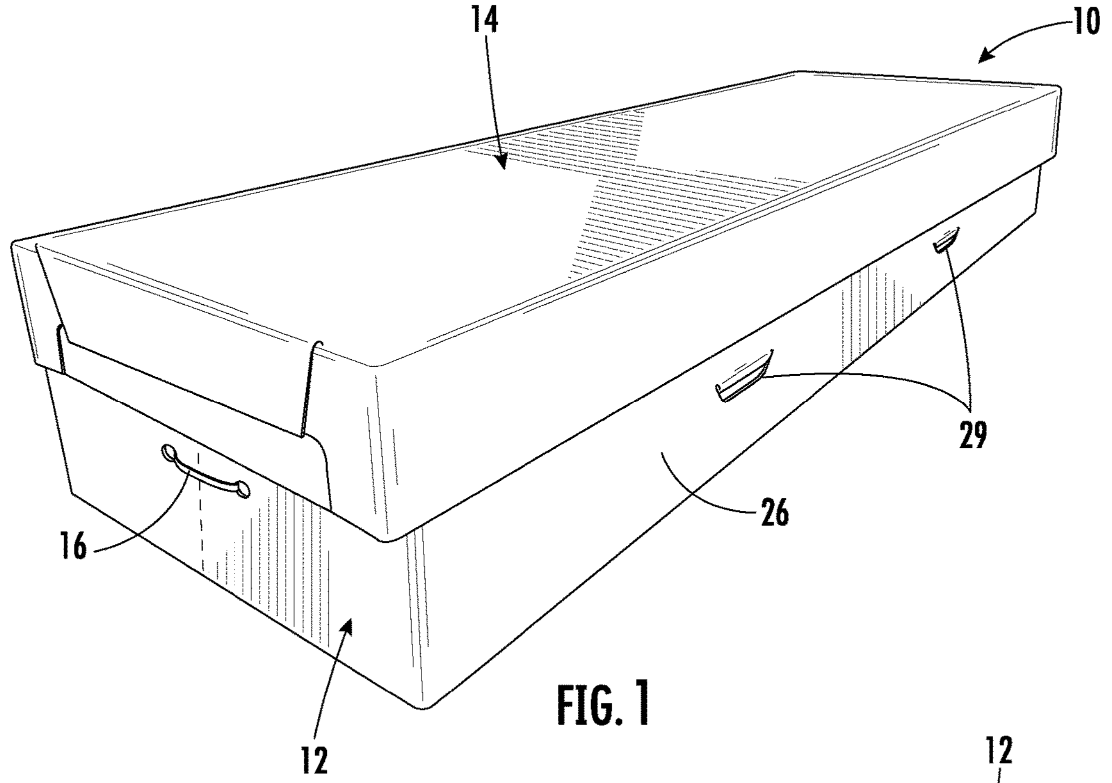
FIG. 1 is a perspective view of a casket according to one embodiment of the present disclosure.

FIG. 1 shows a perspective view of a corrugated paper (fiberboard) casket 10 according to a first embodiment. In general, the casket 10 includes a casket body 12 and at least one casket lid 14. The casket body 12 is a container or tray that has a length and width configured to receive an adult human body in supine (laying) position. In this embodiment, the casket body 12 also has a height configured to receive the adult human body fully within the interior defined by the top edge of the container. In this embodiment, the casket 10 includes a single lid 14. However, in other embodiments, two complementary lids may be used. The casket 10 further includes a fastener 16 at each end of the casket body that is used to hold the casket body together. The fasteners 16 are preferably cable ties or zip-ties, which provide convenience and strength, although other suitable fasteners may be used.

Figure 2:
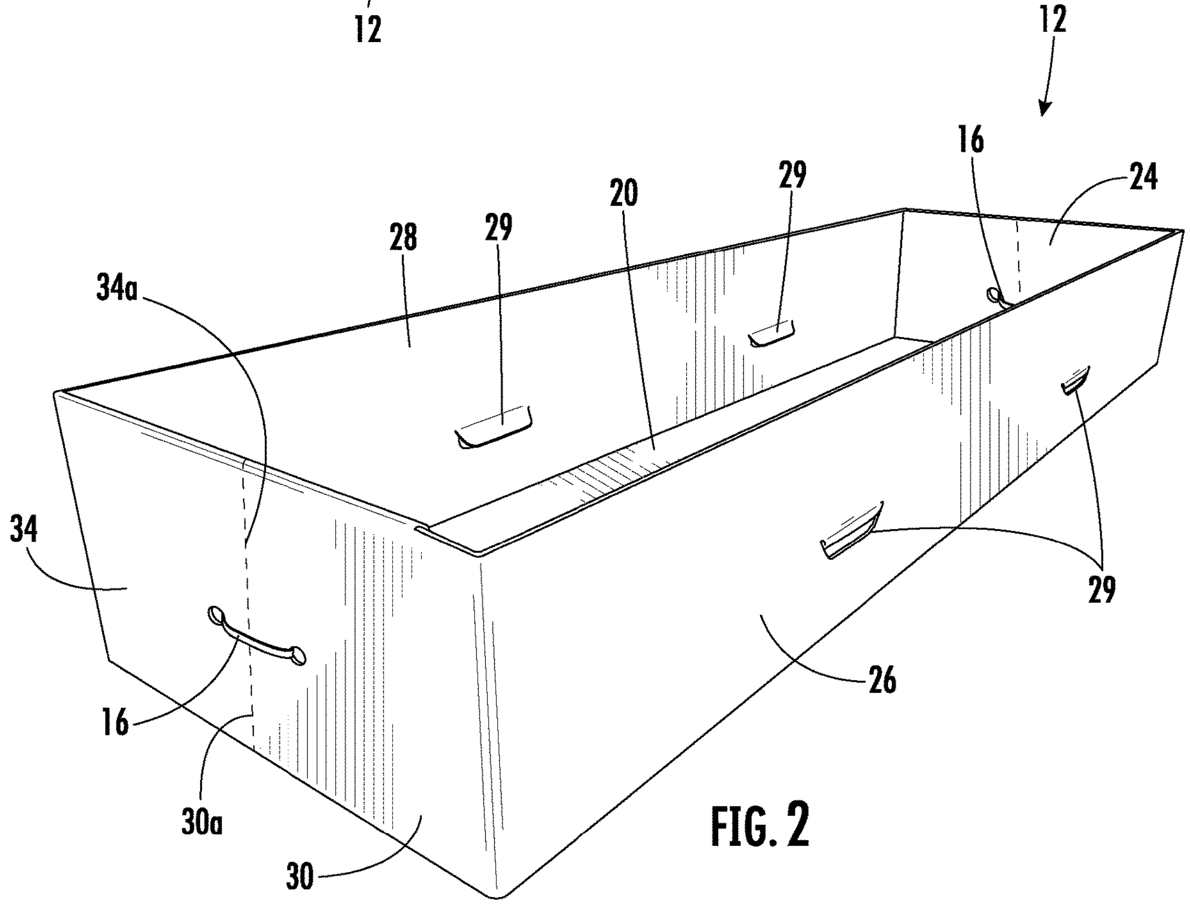
FIG. 2 is perspective view of the casket body of the casket shown in FIG. 1.
Figure 3:
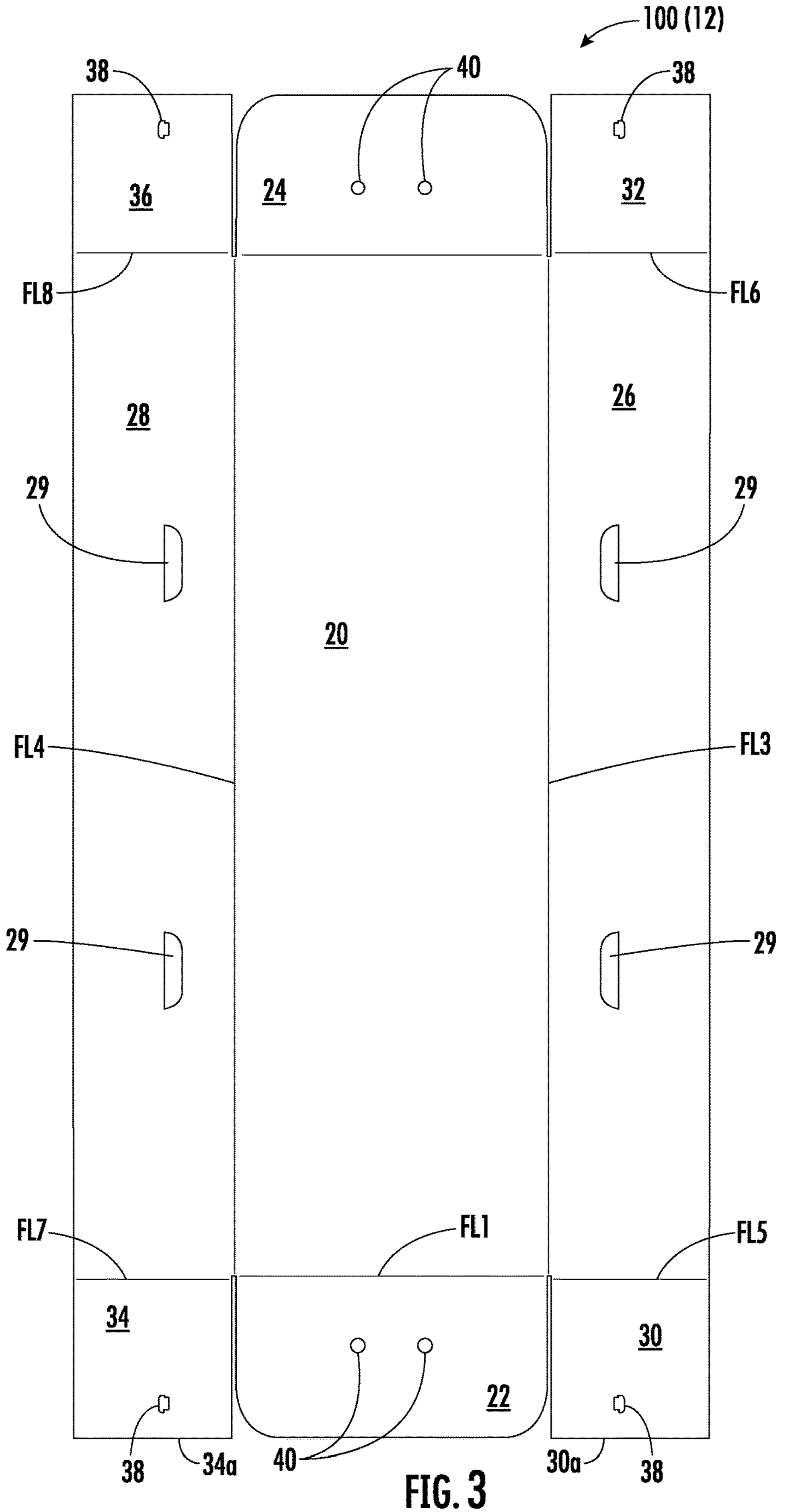
FIG. 3 is a plan view of a blank used to form the casket body shown in FIG. 2.

FIG. 2 shows a perspective view of the casket body 12, and FIG. 3 shows a top plan view of a blank 100 from which the casket body 12 is constructed. In this disclosure, parts of the blank 100 that form the same parts of the casket body 12 shall bear the same reference number. The casket body 12, and hence the blank 100, includes a bottom panel 20, end panels 22, 24, side panels 26, 28, and flaps 30, 32, 34 and 36, all foldably connected to each other. The side panels 26, 28 can include punch-out handles 29. Unless otherwise specifically called out, the foldlines between the panels and flaps are indicated by the abbreviation FL. The blank 100 in this embodiment is formed of double wall corrugated fiberboard, which assists in providing sufficient structural strength for supporting the weight of a human being. Other corrugated fiberboard/paper structures having at least the equivalent or comparable strength may be used. In most embodiments, it is preferable that the corrugated fiberboard have a "Mullen" rating or value of at least 350 lbs. to 500 lbs., and/or an edge crush test rating of at least 51 to 71. It can be appreciated that the blank 100 shown in FIG. 3 is initially provided as a substantially flat sheet, which greatly simplifies storage and shipment of the blank. The foldlines FL can be scored into the corrugated fiberboard sheet forming the blank in a manner known in the art The bottom panel 20 is foldably connected to the end panels 22, 24 at foldlines FL1 and FL2, respectively, and to the side panels 26, 28 at foldlines FL3 and FL4, respectively. The flaps 30, 32 are foldably connected to opposite ends of side panel 26 at foldlines FL5 and FL6, respectively, and the flaps 34, 36 are connected to opposite ends of side panel 28 at foldlines FL7 and FL8, respectively. It can be appreciated that in the blank 100 the flaps 30, 34, 32, 36 are not connected to the respective adjacent end panels 22, 24, but are instead separated by a cutline. Each of the flaps 30, 32, 34, and 36 includes a foldable key 38 that is cut into the blank 100, as described in more detail with reference to FIG. 4. Each of the end panels 22, 24 includes at least one receiver 40 that is configured to engage at least one corresponding foldable key 38 when the blank 100 is assembled into a box configuration or, in other words, into the casket body 12 of FIG. 2. It is contemplated that each end panel and two associated flaps include two key and receiver arrangements to engage the flaps to the end panel. The key and receiver arrangements can straddle the center of each end panel and can be positioned near the facing edges of the flaps, such as edges 30*a*, 34*a* as shown in FIG. 2.

Figure 4:
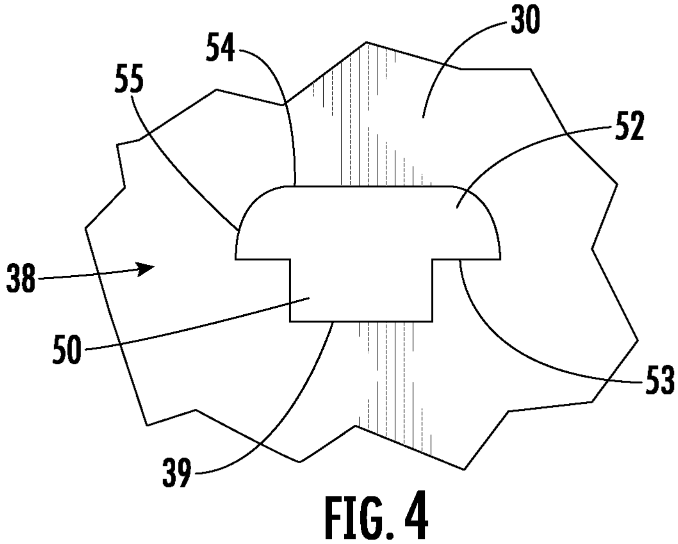
FIG. 4 is an enlarged view of a key formed in a flap of the blank shown in FIG. 3 and casket body shown in FIG. 2.
Figure 6:
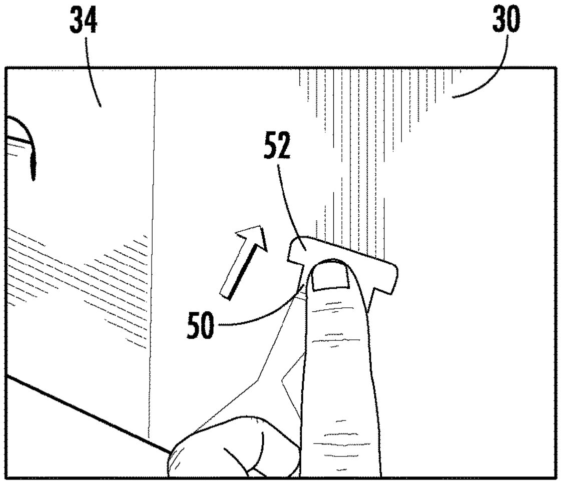
FIG. 6 is a perspective view of a first step in engaging the key of FIG. 4 in the receiver of FIG. 5.

Each key 38 may suitably be formed by a cut in a corresponding flap (e.g., flap 30) of the blank 100, as shown in FIG. 4. An uncut portion of the key 38 forms a hinged connection 39 to the respective flap so that the flap is bendable or foldable at that connection. In this embodiment, each key includes a stem 50 and a head 52 that are defined by the cut in the flap. It can be appreciated that the cut in the flap can be a complete cut, or can be a series of perforations with a web between perforations that s readily severed by pressure on the stem or head of the key. The head 52 has a width that exceeds a width of the stem 50 and can be sized to be engaged by the fingertip of an operator, as shown in FIG. 6. The stem 50 is foldably connected to the respective flap at one end via the hinged connection 39, and is connected to the head 52 at the other end. The head 52 may suitably have a mushroom shape, as depicted in FIG. 4. In a particular embodiment, the edge 53 of the head 52 that attaches to the stem 50 is wider than the opposite edge 54 of the head 52, so that the side edges 55 of the head are tapered. The tapered shape facilitates advancing the head 52 through the receiver 40, while the enlarged edge 53 inhibits the head 52 from being pulled out of the receiver 40.

As noted above, each key 38 is arranged to be pushed or otherwise advanced through a corresponding receiver 40 in an end panel 22, 24. Each receiver 40 shown in FIG. 3 may suitably be formed by a full punch-out in a corresponding end panel (e.g., end panel 22) of the blank 100. In this embodiment, the receiver 40 is a rounded through-hole having a dimension or diameter that is smaller than the width of the edge 53 of the head 52 but greater than the width of the stem 50. Circular punch-outs facilitate ease of manufacturing because they employ standard and conveniently obtained punches. However, other punch-out shapes can work as well, provided that a maximum dimension of the punch-out shape is less than the width of the edge 53 of the key head 52. In any event, the through-hole of the receiver 40 should have at least a portion having a narrower width than the width of the head 52 such that the head 52 does not traverse or pass through the through-hole without some deformation. In this embodiment, the diameter of the circular through-hole is slightly smaller than the width of the head 52 so that the head 52 needs to be deformed/folded to traverse the through-hole. Once the head of the key passes through the receiver 40, the head at least partially returns to its original planar shape to resist withdrawal of the key from the receiver.

Figure 5:
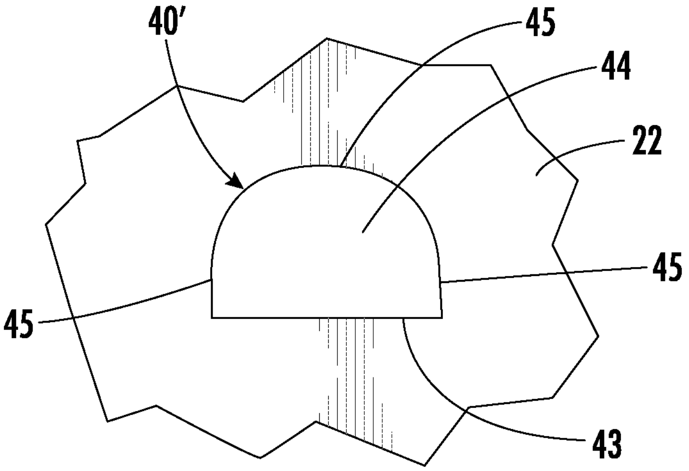
FIG. 5 is an enlarged view of a receiver formed in a side panel of the blank of FIG. 3 and casket body of FIG. 2 in which the receiver is configured to receive the key shown in FIG. 4.

It will be appreciated that the receiver 40 may suitably have an oval shape, a shape similar to that of the key 38, a different t-shape, or a polygonal shape that is otherwise configured to retain the head 52 as discussed above. In another embodiment of a receiver, the receiver 40' shown in FIG. 5 is not a punch-out, but rather a foldably attached tab 44, formed by a U-shaped cut 45 and an uncut foldline 43 (as with all foldlines, it could be scored) on the end panel 22. The foldline 43 acts as a hinge for the tab 44. In this embodiment, the tab 44 is configured to fold into the interior of the casket 12, leaving a U-shaped through-hole, when the key 38 is advanced through the receiver 40', as discussed below.

To assemble the casket body 12, the side panels 26, 28 and the end panels 22, 24 are folded upward 90 degrees from the planar position shown in FIG. 3. The flaps 30, 34 are folded around the end panel 22 toward each other so that their respective edges 30*a*, 34*a* (FIG. 3) are abutting or immediately adjacent, as shown in FIG. 2. When the flap 30 is upright and flat against outer surface of the upright end panel 22, its key 38 aligns with, and is adjacent to, one of the right receivers 40 of the end panel 22. Likewise, the key 38 of the flap 34 aligns with the left receiver 40. The flaps 32, 36 are folded toward each other around the end panel 24 in the same manner so that the keys 38 of the respective flaps align with the right and left receivers 40 of the panel 24.

In this position, the natural bias of the corrugated fiberboard blank 100 is such that if the flap 30, for instance, is not held against the end panel 22 by external force, it will fall away from the end panel 22. This natural bias is reinforced by the natural bias of the side panel 26 and the end panel 22 to fall back down toward the planar state of the original blank 100. Because of the bulk of the thick and large corrugated paper panels, these natural biases make assembly difficult for one operator who must somehow hold the panels up while fastening the panels together, such as with the fastener 16.

Figure 7:
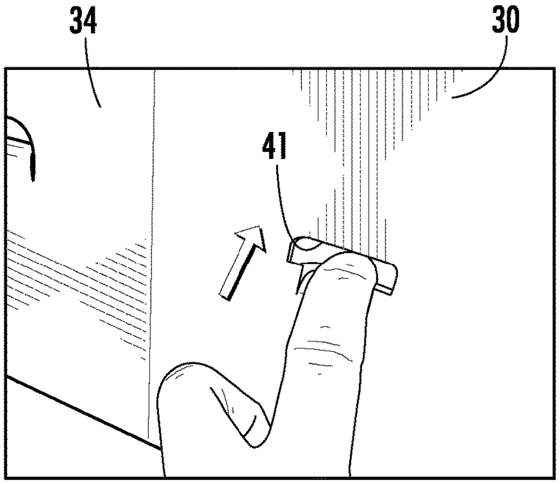
FIG. 7 is a perspective view of a second step in engaging the key of FIG. 4 in the receiver of FIG. 5.
Figure 8:
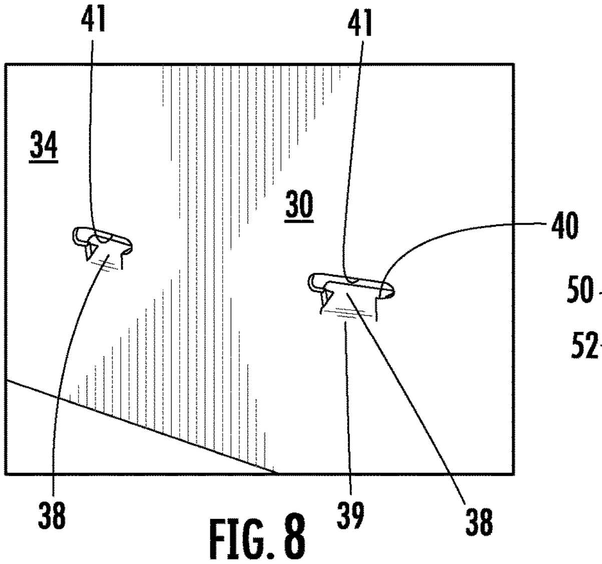
FIG. 8 is a perspective view from the exterior of the casket body showing the engagement of the key of FIG. 4 in the receiver of FIG. 5.

To address this difficulty, the operator uses the key and receiver arrangement in this embodiment to at least temporarily hold each flap against and in direct engagement with a corresponding end panel. The engagement of the flap 30 to the end panel 22 is illustrated in FIGS. 6-8. With the key 38 aligned with the receiver 40, as described above, the operator uses a finger or tool to push inward against the head 52 (and/or stem 50) of the key 32 as shown in FIG. 6. The pressure causes the head 52 and stem 50 to move or bend toward and into the receiver 40, as shown in FIG. 7. Because the receiver 40 has less width than the head 52, the head 52 in this embodiment deforms from the pressure sufficiently to traverse the through-hole of the receiver 40. Sloped or rounded forward edges of the head 52 (such as shown in FIG. 4) can guide the deformation. Once clear, the head 52 recovers all or some of its original size so that when the operator pressure is removed, the head 52 does not fall back out of the receiver 40. The key 38 is sized to be engaged by the operator's fingertip, but the maximum size and width of the head 52 is limited, first to ensure that the head deforms uniformly when being pushed into the receiver 40. Second, limiting the size allows the head recovers enough of the original shape and width to prevent removal of the key from the receiver. In one specific embodiment, the width of the edge 53 can be about 1.25 inch, while the diameter of the receiver can be 1.0 inch. The width of the stem 50 can be slightly less than 1.0 inch.

Figure 9:
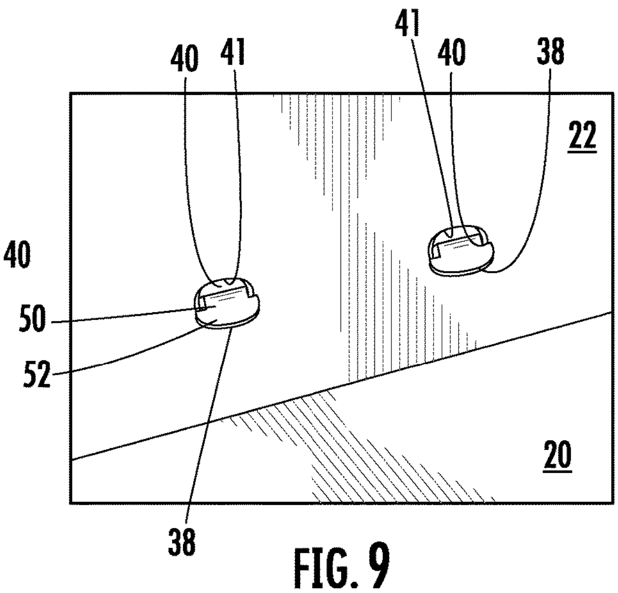
FIG. 9 is a perspective view from the interior of the casket body showing the engagement of the key of FIG. 4 in the receiver of FIG. 5.

It can be appreciated that the stem 50 has a length from the hinged connection 39 to the edge 53 of the head 52 sufficient to span the thickness of the two panels 30, 22 when the key is pressed into the receiver so that the head 52 is disposed entirely inside the end panel 22, as shown in FIG. 9. As a consequence, the flap 30 is held against the end panel 22 (and thus forms another layer of the end panel in this embodiment). In addition, the folding of the key 38 out of planar alignment with the remainder of the flap 320 creates an opening 41 through the flap 30 where the head 52 and most or all of the stem 50 had been, as shown in FIGS. 8-9.

The key 38 can also be used with the modified receiver 40' of FIG. 5. With this embodiment, when the head 52 of the key is pressed toward the panel 22, the operator can continue to press the key to bear against the tab 44 to bend the tab about the hinge 43. With this embodiment, both the head 52 of the key 38 and the tab 44 will be exposed at the interior of the casket, just as the head 52 is visible in FIG. 9.

The operator repeats this operation, using the corresponding key 38 and receiver 40 to retain the flap 34 against the end panel 22, and to retain the flaps 32, 36 against the end panel 24. The flaps 30, 32, 34 and 36 may be engaged in any order, although it is more convenient to engage both flaps on either corresponding end panel sequentially—i.e., flap 30 is connected to panel 22, followed by flap 34, and then flap 32 is connected to panel 24, followed by flap 36.

The result of such operations is shown in FIGS. 8 and 9. FIG. 8 shows a fragmentary perspective of the outside of the end panel with the keys 38 of the flaps 30, 34 engaging the receivers 40 of the end panel 22. FIG. 9 shows a fragmentary perspective of the inside of the end panel with the keys 38 of the flaps 30, 34 engaging the receivers 40 of the end panel 22.

Figure 10:
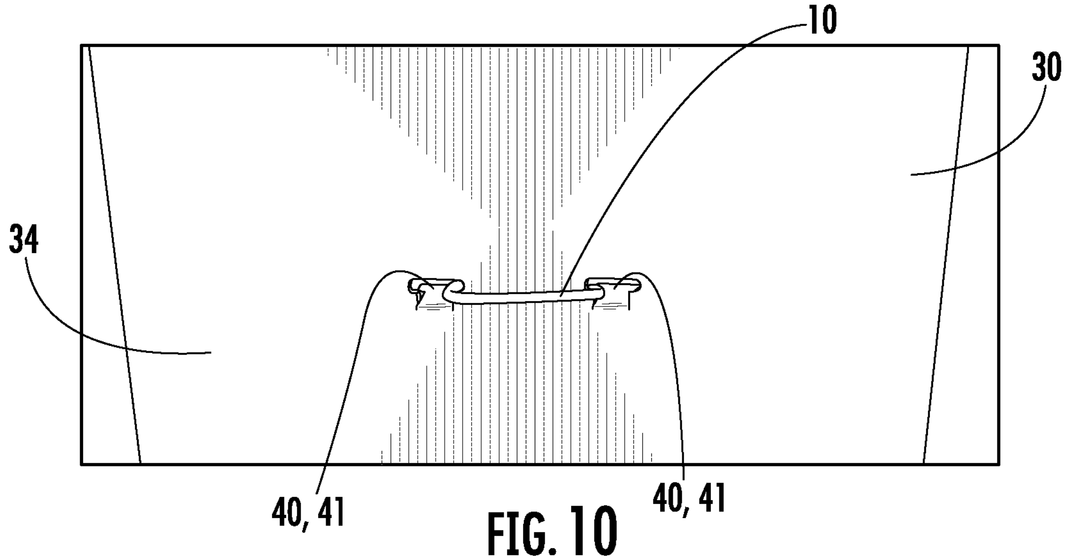
FIG. 10 is a perspective view from the exterior of the casket body showing a fastener fixed between the keys and receivers at one end of the casket body shown in FIG. 2.
Figure 11:
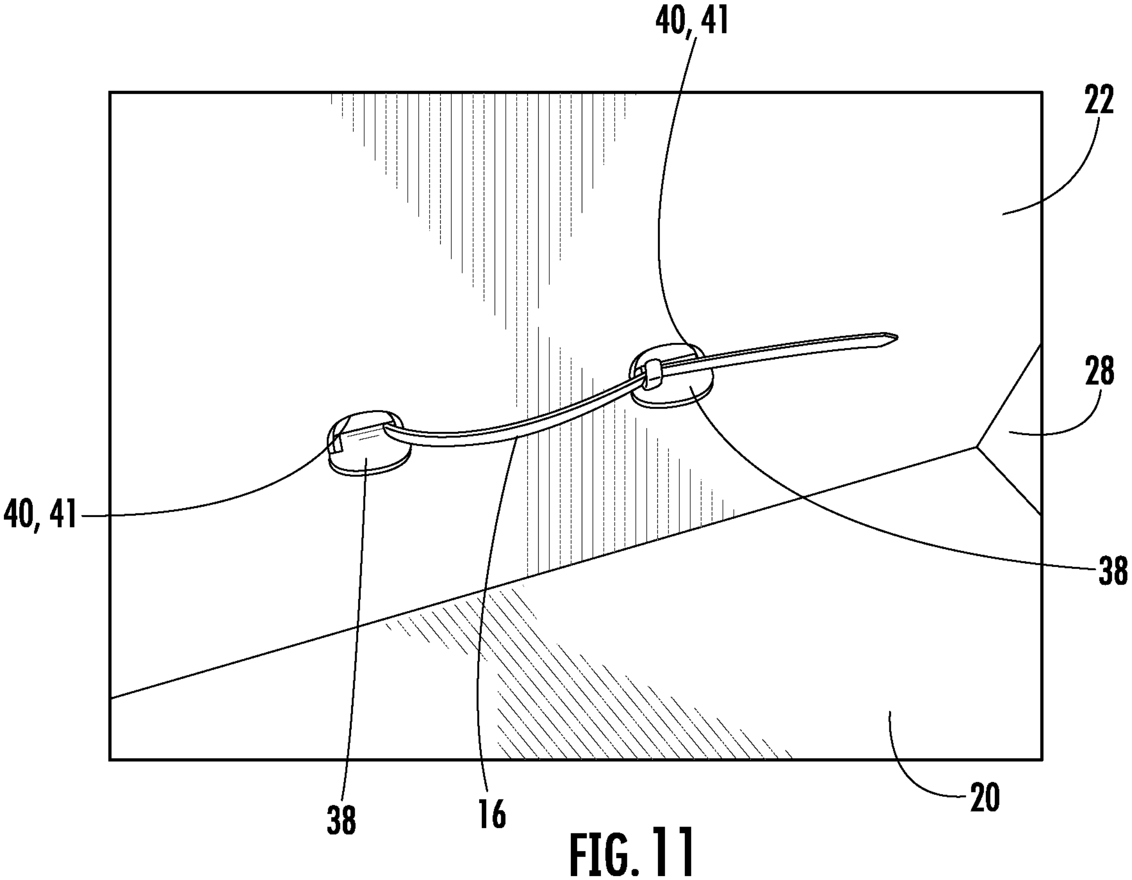
FIG. 11 is a perspective view from the interior of the casket body showing the fastener of FIG. 10.

Thereafter, the operator may use the fastener 16 to further secure the flaps 30, 34 to the end panel 22. As discussed above, in this embodiment, each engaged key 38 and receiver 40 forms a corresponding through-hole 40, 41 through the entire end wall formed by each flap 30, 34 and the end panel 22. The fastener 16 in this embodiment is a cable tie that is fed through the through-hole 41 and receiver 40 formed through the flap 30 and the end panel 22, and then through the through-hole 41 and receiver 40 formed through the flap 34 and the end panel 22. The fastener 16 is then secured in a conventional manner for a cable tie, thereby securing the flaps 30, 34 to the end panel 22 as shown in FIGS. 10 and 11. Other fasteners can be used that are capable of engaging the pair of through-hole combinations 40/41 between the two panels 30, 34, such as a twist-tie or a U-shaped clip. Alternatively, although less convenient, a fastener, such as a plastic pop-rivet, can be engaged in each through-hole combination 40/41 individually.

The operator may then secure the flaps 34, 36 to the end panel 24 in the same manner. Thereafter, the casket body 12 is complete. It will be appreciated that the deceased may be placed onto the bottom 20 of the casket body 12 before, during or after assembly from the blank 100. The lid 14 may be any suitable structure that covers the casket body. In some cases, a lid may not be used at all. It will be appreciated that the lid 14 in some embodiments is taller than the casket body 12 (which is sometimes called a tray). In such a case, the lid 14 may be constructed in the same manner as the casket body 12 described above. In other words, the lid 14 may be formed from a blank that is similar to that of FIG. 3, and that uses a key and receiver system for assembly.

It can be appreciated that the key 38 can be integrated in each end panel 22, 24, rather than in the flaps 30, 32, 34, 36. With this modification, a receiver 40, 40' is integrated into the flaps 30, 32, 34, 36. The manner of assembly is the same as described above, except that the key 38 would be pressed outward from the end panel 22, 24 into the receiver in a corresponding flap. The fastener 16 can be applied in the same manner, extending through the through-hole combinations 40/41 between the two panels.

It will be appreciated that the above-described embodiments are merely illustrative, and that those of ordinary skill in the art may readily devise their own implementations and modifications that incorporate the principles of the present invention and fall within the spirit and scope thereof.

What is claimed is:

1. A method for constructing a casket from a foldable blank having a bottom panel, two end panels, two side panels and a flap at each opposite end of each side panel, in the blank, comprising:

folding the two end panels and two side panels upward relative to the bottom panel to define a box configuration;

folding the flap at each end of each side panel to overlap a corresponding end panel; and for each overlapping flap, advancing a key, foldably connected to one of the corresponding end panel and the overlapping flap, into a through-hole defined in the other of the corresponding end panel and the overlapping flap to at least temporarily hold the overlapping flap in direct engagement with the corresponding end panel to retain the foldable blank in the box configuration; and wherein the step of advancing the key creates a through-hole in said one of said corresponding end panel and said overlapping flap, and the method comprises an additional step of engaging a fastener that extends through each through-hole in the end panel and the through-hole in each overlapping flap.

2. The method of claim 1, wherein said key defines a width and said through-hole defined in the other of the corresponding end panel and the overlapping flap has a dimension less than said width of said key to prevent said key from traversing said through-hole defined in the other of the corresponding end panel and the overlapping flap without temporarily deforming said key.

3. The method of claim 2, wherein said key includes:

an elongated stem and integral enlarged head formed by a cut in said one of said flap and said corresponding end panel, wherein said elongated stem is foldably connected at one end thereof to said one of said flap and said corresponding end panel;

said enlarged head is provided at an opposite end of said elongated stem, said head defining said width, and said stem has a corresponding width less than said dimension of said through-hole defined in the other of the corresponding end panel and the overlapping flap.

4. The method of claim 3, wherein said other of the end panel and the overlapping flap includes a foldable tab that is folded to form the through-hole in the other of the end panel and the overlapping flap when the key is advanced therethrough.

5. The method of claim 1, wherein said blank is formed of corrugated paper.

6. The method of claim 1, wherein the fastener is a cable tie.

7. The method of claim 1, wherein said other of the end panel and the overlapping flap includes a foldable tab that is folded to form the through-hole in the other of the end panel and the overlapping flap when the key is advanced therethrough.

8. The method of claim 7, wherein said foldable tab is formed by a U-shaped cut in said other of the corresponding end panel and the overlapping flap.

9. A method for constructing a casket from a foldable blank having a bottom panel, two end panels, two side panels and a flap at each opposite end of each side panel, in the blank, comprising:

folding the two end panels and two side panels upward relative to the bottom panel to define a box configuration, each of the two end panels including two spaced-apart through-holes;

folding the flap at each end of each side panel to overlap a corresponding end panel, in which the flap includes a key foldably connected thereto, and wherein the flap is folded so that the key is aligned with one of the through-holes in the corresponding end panel;

for each flap, advancing the key into the aligned through-hole to at least temporarily hold the overlapping flap in direct engagement with the end panel to retain the foldable blank in the box configuration, wherein advancing the key creates a through-hole in the overlapping flap; and engaging a fastener between each through-hole in the end panel and the through-hole in each overlapping flap.

10. The method of claim 9, wherein the fastener is a cable tie.

11. The method of claim 9, wherein the end panel includes a foldable tab that is folded to form the through-hole in the end panel when the key is advanced into the through-hole in the end panel.

12. The method of claim 11, wherein the end panel includes a U-shaped cutout that forms the foldable tab.

* * * * *